United States Patent
Patil et al.

(10) Patent No.: US 9,747,071 B2
(45) Date of Patent: *Aug. 29, 2017

(54) DIRECT SELECTION OF AUDIO SOURCE

(71) Applicant: Bose Corporation, Framingham, MA (US)

(72) Inventors: Naganagouda B. Patil, Ashland, MA (US); Rebecca DeVeer Crimmin, Arlington, MA (US); Douglas Warren Young, Arlington, MA (US)

(73) Assignee: BOSE CORPORATION, Farmingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,765

(22) Filed: Jun. 10, 2016

(65) Prior Publication Data

US 2016/0283194 A1  Sep. 29, 2016

Related U.S. Application Data

(63) Continuation of application No. 14/193,737, filed on Feb. 28, 2014, now Pat. No. 9,398,373.

(51) Int. Cl.
*H02B 1/00* (2006.01)
*G06F 3/16* (2006.01)
(Continued)

(52) U.S. Cl.
CPC .......... *G06F 3/167* (2013.01); *G06F 3/04842* (2013.01); *G06F 3/165* (2013.01);
(Continued)

(58) Field of Classification Search
CPC ......... H04R 3/00; H04R 1/1041; G06F 3/048; G06F 3/16; G01C 21/3697; G01C 21/3655; H04W 12/06
(Continued)

(56) References Cited

U.S. PATENT DOCUMENTS

| | | | | |
|---|---|---|---|---|
| 4,740,882 A | * | 4/1988 | Miller | G05B 19/042 340/3.1 |
| 5,805,672 A | * | 9/1998 | Barkat | H04B 1/3877 379/355.01 |

(Continued)

FOREIGN PATENT DOCUMENTS

| | | | | |
|---|---|---|---|---|
| CN | 102594988 | * | 7/2012 | ............ H04M 1/725 |
| CN | 102594988 A | | 7/2012 | |
| WO | 0217099 A1 | | 2/2002 | |

OTHER PUBLICATIONS

International Search Report and Written Opinion dated Jun. 3, 2015 for International application No. PCT/US2015/017635.

*Primary Examiner* — Vivian Chin
*Assistant Examiner* — Ubachukwu Odunukwe
(74) *Attorney, Agent, or Firm* — Patterson + Sheridan, LLP

(57) ABSTRACT

When an indication is received from a user input, a name of an audio source from an ordered list of audio sources to which a headset is currently connected is output. Whenever a successive indication is received within a predefined amount of time, the name of the next wireless audio source in the list is output. If the next wireless audio source in the list is the last wireless audio source in the list, and the successive indication from the user input is received before the elapsed time exceeds the predefined value, the name of the audio source to which the headset is currently connected is output as the next selected wireless audio source in the list. When an amount of time greater than the predefined value elapses without a successive indication from the user input, the last wireless audio source that had its name output is connected.

14 Claims, 3 Drawing Sheets

(51) Int. Cl.
*G10L 15/26* (2006.01)
*H04R 3/00* (2006.01)
*H04R 1/10* (2006.01)
*G10L 13/00* (2006.01)
*G06F 3/0484* (2013.01)
*H04M 1/60* (2006.01)
*G10L 21/00* (2013.01)
*H04W 4/00* (2009.01)
*G10L 13/08* (2013.01)
*H04R 5/02* (2006.01)
*H04R 27/00* (2006.01)

(52) U.S. Cl.
CPC .............. *G10L 13/00* (2013.01); *G10L 15/26* (2013.01); *H04R 1/1041* (2013.01); *H04R 3/00* (2013.01); *G10L 13/08* (2013.01); *G10L 21/00* (2013.01); *H04M 1/6066* (2013.01); *H04M 2250/02* (2013.01); *H04R 5/02* (2013.01); *H04R 27/00* (2013.01); *H04R 2420/01* (2013.01); *H04R 2420/03* (2013.01); *H04R 2420/05* (2013.01); *H04R 2420/07* (2013.01); *H04W 4/008* (2013.01)

(58) Field of Classification Search
USPC .............. 381/123, 110, 309, 311; 455/41.2; 707/E17.121; 370/349, 449; 704/200, 704/210, 251, 275, E13.001
See application file for complete search history.

(56) References Cited

U.S. PATENT DOCUMENTS

| | | |
|---|---|---|
| 9,398,373 B2 | 7/2016 | Patil et al. |
| 2003/0223604 A1 | 12/2003 | Nakagawa |
| 2007/0026869 A1* | 2/2007 | Dunko .................. G06F 1/1613 455/456.1 |
| 2007/0152800 A1 | 7/2007 | Seydoux |
| 2008/0032650 A1* | 2/2008 | Zhang .................. H04M 1/6091 455/185.1 |
| 2008/0165024 A1* | 7/2008 | Gretton .............. G01C 21/3655 340/4.31 |
| 2010/0250253 A1 | 9/2010 | Shen |
| 2012/0297124 A1* | 11/2012 | Ohashi ................ G06F 12/0246 711/103 |
| 2013/0226591 A1 | 8/2013 | Ahn et al. |
| 2014/0059444 A1* | 2/2014 | Yun ......................... H04L 41/22 715/738 |

* cited by examiner

DIRECT SELECTION OF AUDIO SOURCE

PRIORITY CLAIM

This application is a continuation of and claims priority to U.S. patent application Ser. No. 14/193,737, filed on Feb. 28, 2014, the entire contents of which are incorporated herein by reference.

BACKGROUND

The present invention relates to wireless technology, and more specifically to direct selection of an audio source.

In general, Bluetooth® wireless technology is a wireless communications system intended to replace the cables connecting electronic devices. In order for two devices to communicate over Bluetooth, they must first be paired. A pairing sequence between two Bluetooth devices typically requires user setup actions on both devices and time for the Bluetooth devices to discover each other. Once devices are paired, they may be connected and disconnected under the control of the devices themselves without repeating the pairing process. Devices may be connected for various purposes, including remote control, exchange of data, or playback of audio signals generated by one device on a speaker in another device. One host device may be paired to multiple peripheral devices, but is normally only connected to one at a time, for each of one or more types of connection. In the context of this application, when we refer to "Bluetooth" we are referring to protocols and connections operating according to the version of the Bluetooth specification released by the Bluetooth Special Interest Group (Bluetooth SIG) as of the filing date of this application, which is Version 4.0 [Vol 0], 30 June 2010. Other wireless technologies may provide similar features and capabilities and may be used in the same manner.

SUMMARY

The following presents a simplified summary in order to provide a basic understanding of some aspects of the invention. This summary is intended to neither identify key or critical elements of the invention nor delineate the scope of the invention. Its sole purpose is to present some concepts of the invention in a simplified form as a prelude to the more detailed description that is presented later.

In general, in one aspect, a wireless audio output device includes at least a processor, a memory, a wireless interface, a user input, and a speaker. A list of two or more paired wireless audio sources is stored in the memory, the list including information about each wireless audio source, the information including a name of each wireless audio source, the list including at least a first wireless audio source and a last wireless audio source. An indication is received from the user input A text-to-speech engine is used to generate an audio signal corresponding to a name of a selected wireless audio source in the list. The speaker is used to output the audio signal. If an amount of time greater than a predefined value elapses without receiving a successive indication from the user input, the output device connects to the selected wireless audio source.

Implementations may include one or more of the following, in any combination. Whenever a successive indication is received from the user input before the elapsed time exceeds the predefined value, the text-to-speech engine is used to generate a next audio signal corresponding to a name of a next selected wireless audio source in the list, and the speaker is used to output the next audio signal. When an amount of time greater than the predefined value elapses without a successive indication from the user input, the next selected wireless audio source is connected. If the next selected wireless audio source in the list is the last wireless audio source in the list, and the successive indication from the user input is received before the elapsed time exceeds the predefined value, the first wireless audio source in the list is used as the next selected wireless audio source in the list.

A first and a second wireless audio source from the list may both be connected to the wireless output device, the first connected source being a primary source and the second connected source being a secondary source. Whenever a successive indication is received from the user input before the elapsed time exceeds the predefined value, the text-to-speech engine is used to generate a next audio signal corresponding to a name of a next selected wireless audio source in the list, and the speaker is used to output the next audio signal, and when an amount of time greater than the predefined value elapses without a successive indication from the user input, the wireless output device is connected to the next selected wireless audio source. If the next selected wireless audio source is also the second connected source, the second connected source is re-assigned as the primary source and the first connected source is re-assigned as the secondary source, and if the next selected wireless source is other than the first or the second connected sources, the next selected wireless source is assigned as the primary source and the first connected source is re-assigned as the secondary source. The text-to-speech engine may be used to generate a confirming audio signal corresponding to the names of the primary and secondary sources, and the speaker used to output the confirming audio signal.

The wireless interface may include a Bluetooth wireless interface, and the list of wireless audio sources may include a list of Bluetooth sources paired with the wireless audio output device. The elapsed time may be measured from the receipt of the indication from the user interface. The elapsed time may be measured from the outputting of the audio signal identifying the current or next audio source. The user input may include a momentary activation of a switch having a momentary activation state. If an indication is received that the switch was held in the momentary activation state for a pre-determined period of time, the wireless interface may be operated to detect an additional wireless audio source, pair with the additional wireless audio source, and add the additional wireless audio source to the list. If connecting to the selected wireless audio source fails and an error message is received from the selected wireless audio source, the wireless device may repair with the selected wireless audio source. The user input may includes an output from an electronic user interface, the output corresponding to a next source indication within the electronic user interface. Using the text-to-speech engine may include accessing the text-to-speech engine through a wireless connection to one of the paired wireless audio sources. The switch may include a three-position sliding switch having first, second, and third positions, the switch remaining in the first or second positions when placed there and returning to the second position when placed in the third position and released, the momentary activation state including being placed in the third position.

In general, in one aspect, a set of headphones includes a processor, a memory, a Bluetooth wireless interface, a switch having a momentary activation state, and a pair of speakers. The memory contains an ordered list of Bluetooth-enabled audio sources having been previously paired to the wireless audio output device, the list including information about each audio source, the information including a name of each audio source, and at least a first audio source and a last audio source. The processor is configured to carry out an audio source selection process including receiving an indication from the user input and using the speaker to output a name of an audio source in the list to which the headset is currently connected. Whenever a successive indication is received from the user input before an amount of time greater than a predefined value passes after the outputting, the speaker is used to output a next audio signal corresponding to a name of a next wireless audio source in the list. If the next wireless audio source in the list is the last wireless audio source in the list, and the successive indication from the user input is received after outputting the next audio signal and before the elapsed time exceeds the predefined value, the name of the audio source to which the headset is currently connected is output as the next selected wireless audio source in the list. When an amount of time greater than the predefined value elapses without a successive indication from the user input, the last wireless audio source that had its name output is connected.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
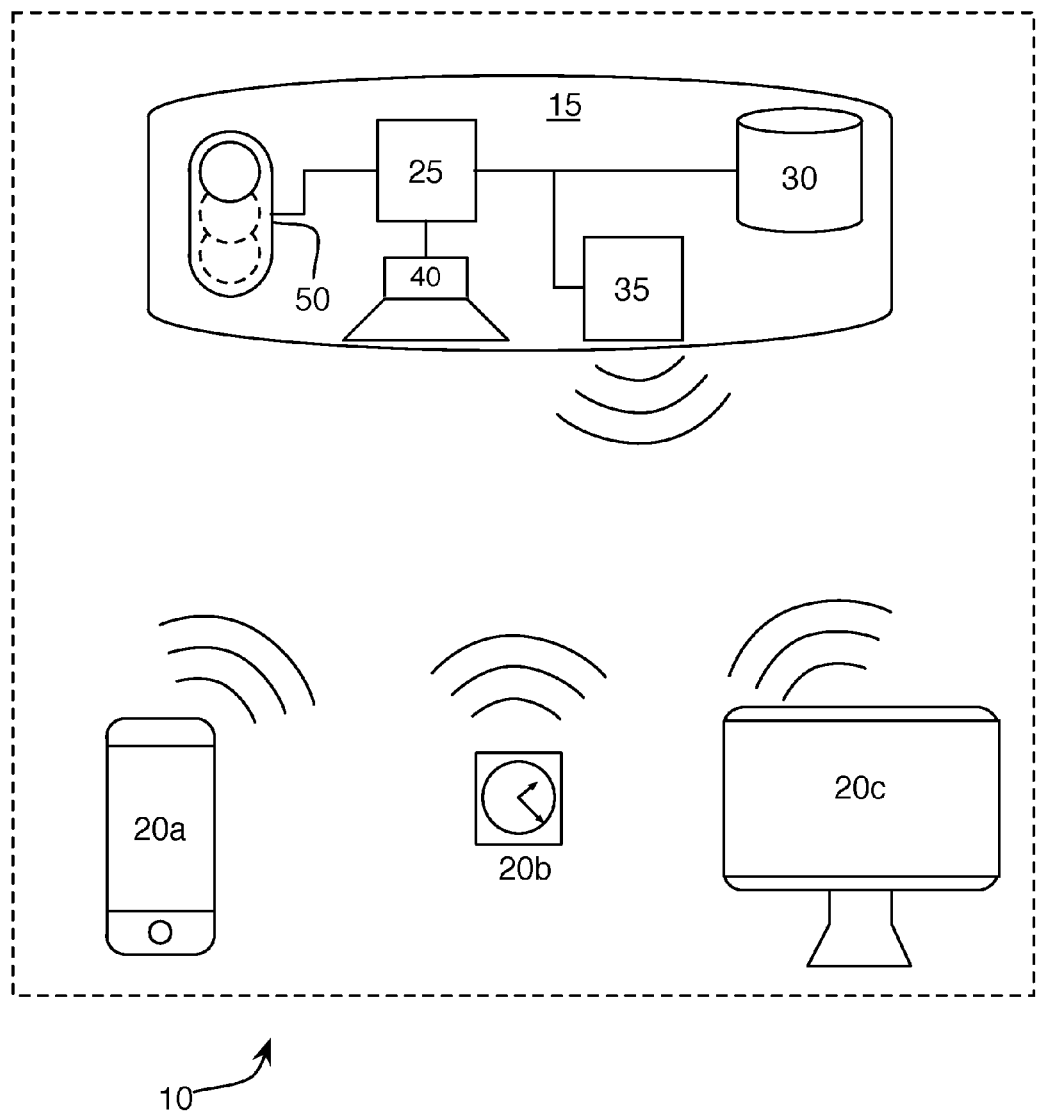
FIG. 1 is a block diagram of an exemplary wireless entertainment system.

As shown in FIG. 1, an exemplary wireless entertainment system 10 includes a wireless playback device 15 and one or more wireless audio sources 20a, 20b and 20c. Example wireless playback devices include, but are not limited to, a headset, a portable speaker, an automobile entertainment system, a home theater system, and so forth. Example wireless audio sources 20a, 20b, 20c include, but are not limited to, an entertainment system, a communication system, a personal computer, a smart watch, and so forth. In some examples, Bluetooth wireless technology is used to provide wireless communication between the components of the system.

In some examples, the wireless playback device 15 includes a processor 25, a memory 30, a wireless communication module 35, and a speaker 40. The wireless communication module may include, for example, a Bluetooth wireless communication interface or other similar interface. The wireless playback device 15 also includes a switch 50 linked to the processor 25. In one example, the switch 50 is a momentary switch. In another example, as shown in FIG. 1, the switch 50 is a multi-position sliding switch, such as a three position switch in which at least one of the positions is stable, i.e., the switch stays there when placed there, and at least one of the positions is momentary, i.e., the switch returns to the stable position from the momentary position when released. In some examples, such a position has two stable positions corresponding to an on state and off state for the device, and a third, momentary position used as the momentary switch 50 as described below. In other examples, the wireless playback device 15 includes an electronic user interface (UI), in which case the switch 50 in FIG. 1 represents a particular signal output from that UI to the processor 25.

The processor 25 controls the general operation of the wireless playback device In some examples, where Bluetooth or a similar wireless technology is used, the processor 25 initiates a Bluetooth-specific function implemented in the wireless module 35 upon detecting certain events, as described below. The processor 25 initiates an operation (e.g., pairing) necessary to establish communication between the wireless playback device 15 and the one or more wireless audio sources 20a, 20b, 20c using Bluetooth wireless technology.

The memory 30 may include any suitable memory technology, such as Read Only Memory (ROM), Random Access Memory (RAM), or flash ROM, to name a few examples. Among other things, the memory stores a microcode of a program for processing and controlling the processor 25 and a variety of reference data, data generated during execution of any of the variety of programs performed by the processor 25, and various updateable data for safekeeping such as a phone book, outgoing messages, incoming messages and the like. Different types of data may be stored in different types of memory. The memory includes executable code for general operation of the wireless playback device, as well as a text-to-speech engine and instructions for performing a process for the direct selection of an audio source. The direct selection of audio source process and the switch 50 enable the processor 25 to connect the wireless module 35 to a wireless audio source from a set of paired sources, as described below, through a simplified user interface (UI) and without manually interacting with the audio sources.

The wireless module 35 enables a wireless connection using Radio Frequency (RF) communication between the wireless playback device 15 and the wireless audio sources 20a, 20b, 20c. The wireless module 35 exchanges a radio signal including data input/output through an antenna (not shown). For example, when using Bluetooth wireless technology in a transmission mode, the wireless module 35 processes data by channel coding and spreading, converts the processed data into a Radio Frequency (RF) signal and transmits the RF signal. In a reception mode, the wireless module 35 converts a received RF signal into a baseband signal, processes the baseband signal by de-spreading and channel decoding and restores the processed signal to data.

Each of the wireless audio sources, audio source 20a for example, can include a processor, a memory, and a wireless communication module implementing Bluetooth or other appropriate wireless technology. The particular construction and technology of the source devices is not within the scope of this disclosure, except to note that wireless communication module is compatible with the wireless module 35 of the wireless audio source 15, such that it interacts with the wireless playback device in the manner described below. In some examples, the text-to-speech engine is contained within one of the connected wireless audio sources and available for use by the wireless playback device, or is provided by an on-line service that the wireless playback device can connect to through one of the wireless audio sources which is also connected to a wide-area network.

Figure 2:
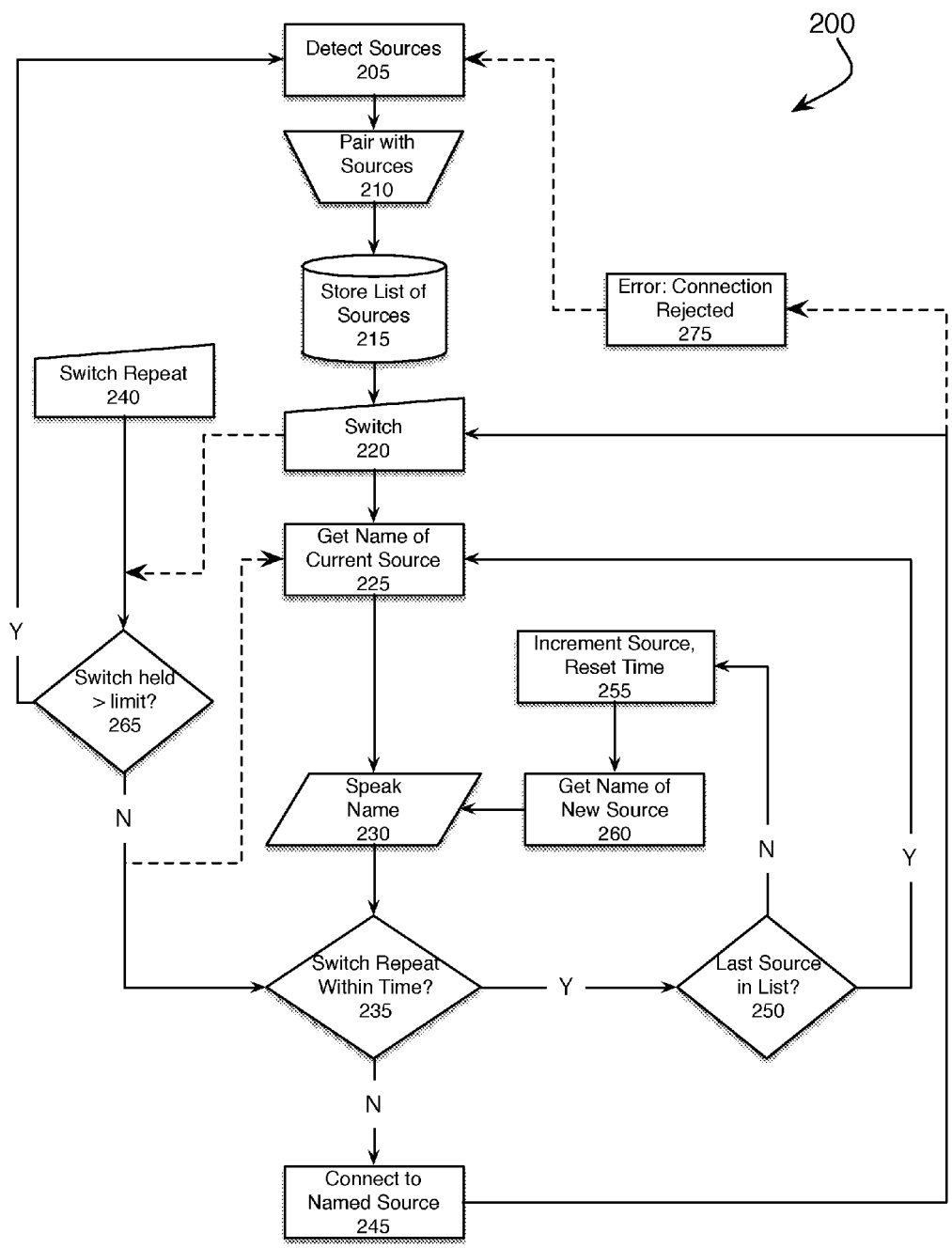
FIGS. 2 and 3 are flow diagrams.

As shown in FIG. 2, a process 200 is performed by the wireless playback device 15 to directly select one of the audio sources. The process 200 begins by detecting (205) wireless audio sources. The playback device then pairs (210) with each of the detected wireless audio sources, for example by carrying out a Bluetooth pairing process for each audio source. The playback device then stores (215) a list of the paired audio sources in the memory, the list including information about each paired audio source. The information includes a name of each of the paired audio source. The steps of detecting, pairing with, and storing the information about the sources may be carried out at any time, with the list of sources used in later steps growing as needed. The remaining steps are relevant when at least two sources have been paired and are included in the list.

In step 220, the playback device receives an indication that the switch 50 has been activated. In response, the playback device looks up (225) the name of the current source, from the information about the source in list of sources or in a store of information specifically about the current source. The playback device then uses a text-to-speech engine residing in the memory to generate an audio signal allowing it to speak (230) the name of the current source.

Once the name has been output, the playback device waits (235) a predetermined amount of time to see if the switch 50 is activated again (240, ignoring optional step 265 discussed below). In some examples, the time is measured from the end of the audio output. In other examples, the time is measured from the last switch input. If the switch is not activated again within the predetermined amount of time, the playback device connects (245) to the source associated with the name that was just output. For the first time through, when the source announced was the currently connected source, step 245 has the effect of maintaining the status quo.

If the successive indication from the switch (240) is received within the predefined amount of time, the playback device offers the next source in the list to the user. It does this by first confirming whether it has reached the end of the list (250). If there are more sources in the list, the playback device increments the offered source to the next source in the list, and resets (255) the time to wait for another switch activation. The playback device looks up the name of the new source (260) and returns to step 230 such that it speaks an audio signal corresponding to the name of the next source in the list. This process is repeated until either the switch is not pressed, and the last-announced source is connected (245), or the end of the list is reached (250).

If the switch keeps getting activated such that the process reaches the end of the list of paired audio sources, and the switch is pressed yet again, the playback device cycles back to the currently connected audio source and starts all over again (225).

While the example above treated the switch 50 as an electronic switch that a user may manually activate, other methods of user input are also suitable. For example, an automatic voice response system may detect the user saying "next source" and provide an electronic indication as the "switch" input 220 to the process 200. In another example, a motion sensor may detect that the user waved her hand in a particular manner and interpret this as a "next source" indication to be provided to the process 200.

Thus, the switch or equivalent input is used to select any of the audio sources from the list of paired audio sources. Each press of the switch goes to a next paired audio source in the list, and the device connects when no further switch indication is received. In some examples, the switch 50 is used to provide an additional user interface feature. If the switch is held in its momentary position, rather than pressed and released, the system will treat this as a different input. For example, as shown by optional step 265 in FIG. 2, holding the switch in the momentary position for longer than some preset limit may indicate that the user wishes to connect to a device not already in the list. The playback device responds by returning to step 205, to detect and pair with a new source that wasn't present when those steps were previously carried out, and add it to the list. The testing of whether the switch has been held for longer than the limit may be performed each time the switch is pressed, i.e., step 265 may be effectively be inserted before step 225, as shown by the dashed lines in the flow chart, as well as coming before step 235. The limit for how long the switch is held to restart pairing may be the same as or different from the time within which the switch must be pressed after the last prompt to cycle to the next source in the list.

The source detecting and pairing steps may also be repeated in other circumstances. For example, if the user has un-paired the playback device from the source device through the user interface of the source device, the playback device will still offer and attempt to connect to the source device when carrying out steps 255, 260, and 230. In such a situation, however, step 245 will fail with an error message (275) coming back from the source device (as opposed to no error coming if the device is merely off or out of range). Instead of simply informing the user that connection failed, the playback device may return to step 205 and re-enter the pairing process so that the user can re-pair the playback device to the source device.

Figure 3:
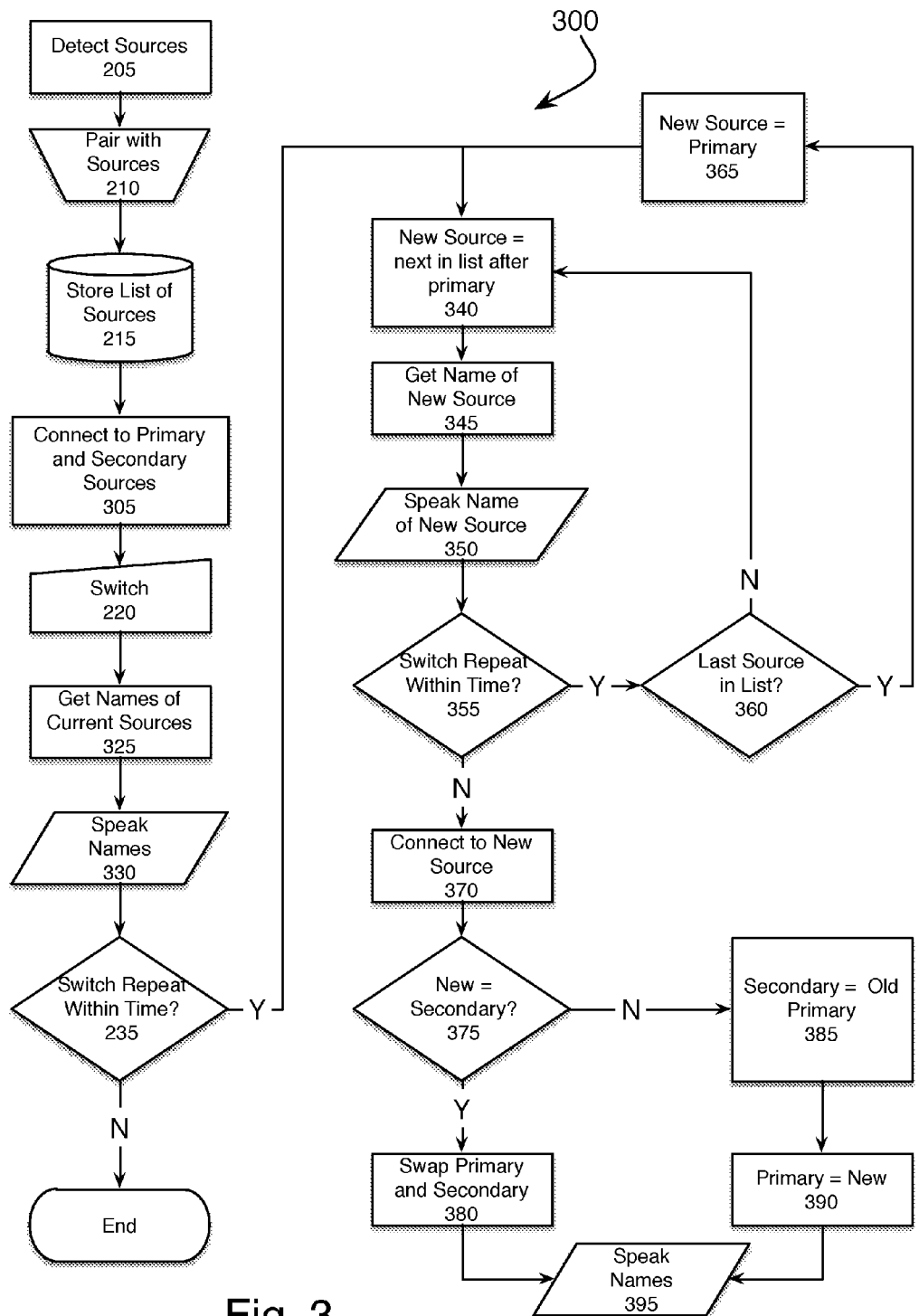

FIG. 3 shows another embodiment of the process of FIG. 2, in which active connections are maintained to two of the sources in the list. The optional step of testing whether the switch has been held for longer than a limit and restarting the pairing process is not shown, but may be used with this process as with process 200. The switch inputs after the first are also not shown but are assumed each time the switch press triggers action. This process 300 begins like process 200, with detecting (205) and pairing (210) with the sources, and storing the list (215) of sources. The playback device then connects to two sources (305), referred to as primary and secondary sources. In some examples, the two sources are handled differently, for example, user interface inputs may be directed to the primary source, while audio will be played back from either source, either mixed or according to the source's priority. The priority may be based on the "primary" or "secondary" designation, or may be based on the type of source, for example, in an aviation headset, the flight radio may always take priority, even if it is the secondary source for user input purposes. In some cases, initiating audio playback from the secondary source may cause the primary and secondary sources to switch places.

When the switch is pressed for the first time (220), the playback device gets the names of both primary and secondary sources (325) and speaks them both (330). If the switch is repeated within the preconfigured time limit (235), the potential new source is set (340) to the next source in the list after the primary. For the first button press, there will always be at least one next source in the list, the secondary source. If only one source is present, the system will fall back to process 200. In some examples, the secondary source is always the first source offered when the user begins this process; in other examples, the order of devices in the list may be fixed, so the secondary source is offered when its turn comes. The playback device gets (345) and speaks (350) the name of the new source. If the switch is pressed again within the preconfigured time limit (355), the device now tests whether it has offered the last source in the list (360). If it has, the new source is set to the primary source (365), cycling back to the beginning of the list as before.

When the user stops pressing the switch, the device connects (370) to the new source, assuming it is other than the current connected sources. In some examples, the playback device can only be connected to two source devices at once, so the old secondary device may be dropped if it wasn't selected as the new primary. If the selected new source was previously the secondary source (375), then the primary and secondary sources are swapped (380), making the previous primary the new secondary and vice-versa. If the new source is not the previous secondary, the new secondary source is set (385) to the previous primary source. In some examples, the secondary source can be used without making it the primary source, so the last-used of the previous primary and secondary sources is made (or kept) the new secondary, and the primary source is set (390) to the new source. This may be advantageous where the user isn't really expected to know the difference between primary or secondary, and just expects the last-used source to remain connected. The trivial case that the new source is the existing primary source, in which case nothing changes, is not shown. Alternatively, selecting the existing primary source may be used to drop the connection to the secondary source, leaving only the primary source connected. After the primary and secondary sources are updated (or not updated, as the case may be), the device speaks both names (395) to confirm for the user the result of the interaction.

For both of the processes discussed above, the list of source devices has an order. In some examples, the order is changed dynamically, so that the primary device, or the only connected device, is at the first position in the list, and the secondary device, if any, is second. Cycling through the list begins with the second position so that the secondary device, if any, is presented first, allowing the user to quickly make it the primary. In some examples, the list as stored in memory is not modified during operation, but the primary device is presented between the last and the first devices when cycling through the list, and the secondary device is presented first when following process 300, with the rest of the stored list then being used in order. In other examples, the list order is followed and the primary and secondary devices are simply presented in turn according to that order. The starting point may be the beginning of the list each time the process is initiated, or it could be the first device after the current primary device, i.e., the overall order is maintained but the starting point varies. In yet another example, only the secondary device changes order, such that it is always offered first, but the primary device is presented in whatever position it holds in the list. In some examples, the playback device includes a power-down process that stores an updated list with the last devices that were primary and secondary moved to the first and second positions in the list, allowing fast restoration of the status quo when the device is powered back up.

The direct selection of audio source process 200 is illustrated in the context of the BLUETOOTH SPECIFICATION Version 4.0 [Vol 0], 30 June 2010. However, it should be understood that the approach described above is equally applicable to other wireless protocols. Furthermore, although certain embodiments are described above as not requiring manual intervention to initiate pairing, in some embodiments manual intervention may be required to complete the pairing, for instance to provide further security aspects to the approach or manual selection if the source device has powered off its radio. While the devices and process described above were in the context of audio sources and an audio playback device, other devices using similar wireless pairing lists can make use of the same process. For example, a tablet computer may be paired with multiple wireless keyboards, and may use a single "connect" user interface element to name and cycle through each of the paired keyboards.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. Accordingly, other implementations are within the scope of the following claims.

What is claimed is:

1. A method comprising, in a wireless audio output device comprising at least a processor, a memory, a wireless interface, and a speaker:
   storing a list of a plurality of paired wireless audio sources in the memory, the list comprising information about each paired wireless audio source of the plurality, the information comprising a name of each paired wireless audio source of the plurality;
   receiving user input that includes a momentary activation of a switch, wherein the user input causes the processor to automatically sequence through the list of the plurality of paired wireless audio sources until a user selection is received, wherein the processor sequences through each paired wireless audio source of the plurality of paired wireless audio sources automatically after an elapsed time in the absence of the user selection;
   using a text-to-speech engine to generate an audio signal corresponding to a name of a selected paired wireless audio source in the list;
   using the speaker to output the generated audio signal;
   sequencing through the list in response to the user input, beginning with a first wireless audio source of the plurality of paired wireless audio sources;
   outputting to a user the generated audio signal corresponding to the name of the first wireless audio source;
   monitoring for the user selection;
   sequencing though the list to a second wireless audio source of the plurality of paired wireless audio sources in the absence of the user selection;
   receiving user selection selecting the second wireless audio source before the elapsed time; and
   using the speaker to playback audio signals generated by the second wireless audio source.

2. The method of claim 1 wherein the elapsed time is measured from one of: the receipt of the user input, and the outputting of the audio signal corresponding to the name of the selected paired wireless audio source.

3. The method of claim 1 wherein the user input comprises a momentary activation of a switch having a momentary activation state.

4. The method of claim 3 further comprising:
receiving an indication that the switch was held in the momentary activation state for a pre-determined period of time,
operating the wireless interface to detect an additional wireless audio source,
pairing with the additional wireless audio source, and
adding the additional wireless audio source to the list.

5. The method of claim 1 further comprising:
if connecting to the selected wireless audio source fails and an error message is received from the selected wireless audio source, re-connecting with the selected wireless audio source.

6. The method of claim 1 wherein using the text-to-speech engine comprises accessing the text-to-speech engine through a wireless connection to one of the paired wireless audio sources.

7. The method of claim 1 wherein the user input indicates a generic pairing request, without identification of a specific wireless audio source for pairing.

8. A wireless audio output device comprising:
a processor,
a memory,
a wireless interface, and
a speaker, wherein
the processor is configured to carry out an audio source selection process comprising:
storing a list of a plurality of paired wireless audio sources in the memory, the list comprising information about each paired wireless audio source of the plurality, the information comprising a name of each paired wireless audio source of the plurality;
receiving user input that includes a momentary activation of a switch, wherein the user input causes the processor to automatically sequence through the list of the plurality of paired wireless audio sources until a user selection is received, wherein the processor sequences through each paired wireless audio source of the plurality of paired wireless audio sources automatically after a predefined time lapse in the absence of the user selection;
using a text-to-speech engine to generate an audio signal corresponding to a name of a selected paired wireless audio source in the list;
using the speaker to output the generated audio signal;
sequencing through the list in response to the user input, beginning with a first wireless audio source of the plurality of paired wireless audio sources;
outputting to a user the generated audio signal corresponding to the name of the first wireless audio source;
monitoring for the user selection;
sequencing though the list to a second wireless audio source of the plurality of paired wireless audio sources in the absence of the user selection;
receiving user selection selecting the second wireless audio source before the predefined time lapse; and
using the speaker to playback audio signals generated by the second wireless audio source.

9. The device of claim 8 wherein the list of wireless audio sources is limited to sources that are detected by the wireless audio output device as being powered on and within range of the wireless interface.

10. The device of claim 8 wherein the processor measures the elapsed time from one of: the receipt of the user input, and the outputting of the audio signal corresponding to the name of the selected paired wireless audio source.

11. The device of claim 8 wherein the user input comprises a switch having a momentary activation state.

12. The device of claim 11 wherein the processor is further configured to:
in response to an indication that the switch was held in the momentary activation state for a pre-determined period of time,
operate the wireless interface to detect an additional wireless audio source,
pair with the additional wireless audio source, and
add the additional wireless audio source to the list.

13. The device of claim 11 wherein the switch comprises a three-position sliding switch having first, second, and third positions, the switch remaining in the first or second positions when placed there and returning to the second position when placed in the third position and released,
the momentary activation state comprising being placed in the third position.

14. The device of claim 8, wherein the user input indicates a generic pairing request, without identification of a specific wireless audio source for pairing.

* * * * *